United States Patent
Xu et al.

(10) Patent No.: US 12,236,693 B2
(45) Date of Patent: Feb. 25, 2025

(54) METHOD FOR NON-DESTRUCTIVE RIPENESS IDENTIFICATION OF KIWIFRUIT BASED ON MACHINE VISION LEARNING

(71) Applicant: GUANGDONG UNIVERSITY OF TECHNOLOGY, Guangdong (CN)

(72) Inventors: Shengbing Xu, Guangdong (CN); Xiaoquan Cai, Guangdong (CN); Zhenyou Wang, Guangdong (CN); Jinzhang Li, Guangdong (CN)

( * ) Notice: Subject to any disclaimer, the term of this patent is extended or adjusted under 35 U.S.C. 154(b) by 363 days.

(21) Appl. No.: 17/886,701

(22) Filed: Aug. 12, 2022

(65) Prior Publication Data
US 2023/0186656 A1    Jun. 15, 2023

(30) Foreign Application Priority Data
Dec. 11, 2021    (CN) .......................... 202111510664.9

(51) Int. Cl.
G06V 20/68    (2022.01)
G06V 10/54    (2022.01)
G06V 10/56    (2022.01)
G06V 10/77    (2022.01)

(52) U.S. Cl.
CPC .............. *G06V 20/68* (2022.01); *G06V 10/54* (2022.01); *G06V 10/56* (2022.01); *G06V 10/7715* (2022.01)

(58) Field of Classification Search
CPC ........ G06T 9/002; G06T 3/4046; H04N 19/59
USPC ......................................................... 382/232
See application file for complete search history.

(56) References Cited

U.S. PATENT DOCUMENTS

2019/0191631 A1*    6/2019    Regan .................... B64U 10/14

\* cited by examiner

*Primary Examiner* — Stephen P Coleman

(57) ABSTRACT

A method for non-destructive ripeness identification of kiwifruit based on machine vision learning may include: collecting kiwifruit data to obtain an original data set by collecting images of 40-80 kiwifruits in the same period of time over 3-6 days, recording a label, which comprises ripeness information for each of the images, and saving each of the images with the label; extracting the color and the texture of a kiwifruit skin from each of the images in the original data set; and training a deep learning model to learn a connection between the color and the texture of the kiwifruit skin and the ripeness information of the corresponding kiwifruit using the color and the texture of the kiwifruit skin extracted from each of the images and the label.

8 Claims, 6 Drawing Sheets

METHOD FOR NON-DESTRUCTIVE RIPENESS IDENTIFICATION OF KIWIFRUIT BASED ON MACHINE VISION LEARNING

CROSS REFERENCE TO RELATED APPLICATION

This application claims priority benefit of Chinese invent Application No. 202111510664.9, filed on Dec. 11, 2021, and the entire contents of which are incorporated herein by reference.

TECHNICAL FIELD

The present disclosure relates to ripeness identification for fruits, and in particular to a method for non-destructive ripeness identification of kiwifruit based on machine vision learning.

BACKGROUND

Kiwifruit is a very good fruit for the human body. It is ideal for both the elderly and children with health and wellness benefits. Kiwifruit is also very popular because of its delicate flesh and sweet and sour taste. However, most kiwifruits on the market need to be kept hard for the convenience of transporting and preserving. Therefore, kiwifruits need to be left at home for a few days after purchase to be softened before they can be eaten. Thus, the ripeness identification of kiwifruit is of great value to both sellers and buyers.

The color and texture of kiwifruit skin will gradually change over time from the unripe to ripe stage. The ripe kiwifruit has a relatively yellow skin color and relatively wrinkled skin, while the unripe one has a relatively green color and relatively smooth skin. In addition, whether or not the kiwifruit was originally damaged will also have an effect on the color, texture, and state of the fuzz of the skin.

The current method of determining the ripeness and edibility of kiwifruit for consumers is mainly empirical. The hand pinching method is used to determine the softness and hardness of the kiwifruit and thus its ripeness. The hand pinching method tends to damage the hand pinching area of the kiwifruit and affects the taste. The use of the hand pinching method, which relies on empirical judgement, results in kiwifruit not being consumed at optimum ripeness frequently, which can affect the consumer's experience. Other known methods of fruit ripeness testing include chemical, force, light, acoustic, and electrical testing, wherein chemical testing involves extracting the juice from the fruit for chemical analysis which can cause damage to the fruit, while non-damaging methods of identification such as force, light, acoustic and electrical testing require relatively expensive equipment which is obviously unacceptable for consumers. People's need for low-cost ripeness identification of kiwifruit cannot be met.

SUMMARY OF THE DISCLOSURE

Aiming at the above problems existing in the related art, the present disclosure provides a method for non-destructive ripeness identification of kiwifruit based on machine vision learning.

According to the first aspect of the present disclosure, a method for non-destructive ripeness identification of kiwifruit based on machine vision learning is provided. The method may include: S1: collecting kiwifruit data to obtain an original data set by collecting images of 40-80 kiwifruits in a same period of time over 3-6 days, recording a label, which comprises ripeness information obtained by pressing at a same location of a corresponding kiwifruit to determine whether the corresponding kiwifruit is ripe using an empirical judgment method, for each of the images, and saving each of the images with the label; S2: extracting a color and a texture of a kiwifruit skin from each of the images in the original data set; and S3: training a deep learning model to learn a connection between the color and the texture of the kiwifruit skin and the ripeness information of the corresponding kiwifruit, wherein the ripeness information is divided into three stages—unripe, slightly ripe and ripe, using the color and the texture of the kiwifruit skin extracted from each of the images and the label.

Typically, the label further comprises damage information indicating whether the corresponding kiwifruit is damaged.

Typically, the training the deep learning model comprises: S31: updating the original data set by applying a data expansion to the ripeness information to obtain an updated data set; and S32: training the deep learning model using the updated data set as a training set.

Typically, the updating the original data set by applying the data expansion to the ripeness information to obtain the updated data set comprises: S311: learning an average ripening time n and thresholds $\theta(\theta_1, \theta_2)$ which divide a ripeness value into three stages—unripe, slightly ripe and ripe using a learning method, wherein the average ripening time n is an average duration $\Delta t$: $\overline{t_2 - t_1}$ for the ripeness information to change from unripe to ripe, $t_1$ is a day number corresponding to the unripe stage, $t_2$ is a day number corresponding to the ripe stage; S312: calculating a ripeness value using a label expansion function $$\beta = \frac{\beta_{t_2} - \beta_{t_1}}{\Delta t} \cdot t$$

for the ripeness information, wherein the t is a day number corresponding to the label, $\beta_{t_1}$ is a ripeness value for the unripe stage corresponding to the day number $t_1$, $\beta_{t_2}$ is a ripeness value for the ripe stage corresponding to the day number $t_2$; and S313: adding the ripeness value to the label or replacing the ripeness information with the ripeness value to obtain the updated data set.

Typically, the deep learning model comprises: model 1-1 configured to determine whether a kiwifruit is damaged, model 1-2 configured to determine the ripeness information of the kiwifruit under the circumstance that the kiwifruit is damaged, and model 1-3 configured to determine the ripeness information of the kiwifruit under the circumstance that the kiwifruit is undamaged.

Typically, the kiwifruit which is damaged is coded as 1, the kiwifruit which is undamaged is coded as 0, the unripe stage is coded as 0, the slightly ripe stage is coded as 1, the ripe stage is coded as 2, a Tensorflow unit in python is used for deep learning; an output of the model 1-1 is $$\begin{cases} \text{Destructive} = \alpha_1 \\ \text{Nondestructive} = \alpha_2 \end{cases}, 0 < \alpha_1, \alpha_2 < 1,$$

an expression of the model 1-1 is $$YN = \begin{cases} 1, & \text{if } \alpha_1 > \alpha_2 \\ 0, & \text{others} \end{cases};$$

an output of the model 1-2 or 1-3 is a ripeness value β, an expression of the model 1-2 or 1-3 is $$\beta' = \begin{cases} 0, & \beta < \theta_1 \\ 1, & \theta_1 < \beta < \theta_2 \\ 2, & \theta_2 < \beta \end{cases}.$$

Typically, the collecting the kiwifruit data to obtain the original data set by collecting the images of 40-80 kiwifruits in the same period of time over 3-6 days comprises: collecting the kiwifruit data to obtain the original data set by collecting the images of 60 kiwifruits in the same period of time over 4 days.

Typically, the images are collected above at least one box having a color contrasting with a color of the kiwifruit and containing at least one of the 40-80 kiwifruits.

According to the second aspect of the present disclosure, a method for non-destructive ripeness identification of kiwifruit based on machine vision learning is provided. The method may include collecting an, image of a kiwifruit; and inputting the image into a deep learning model to estimate ripeness information of the kiwifruit according to a connection between the color and the texture of a kiwifruit skin and the ripeness information, wherein the ripeness information is divided into three stages—unripe, slightly ripe and ripe.

Typically, the deep learning model comprises: model 1-1 configured to determine whether a kiwifruit is damaged, model 1-2 configured to determine the ripeness information of the kiwifruit under the circumstance that the kiwifruit is damaged, and model 1-3 configured to determine the ripeness information of the kiwifruit tinder the circumstance that the kiwifruit is undamaged.

Typically, an output of the deep learning model further comprises a consumption suggestion for the kiwifruit, the consumption suggestion comprises no consumption for the kiwifruit in the unripe stage, consumption in next several days for the kiwifruit in the slightly ripe stage, and consumption in a same day for the kiwifruit in the ripe stage.

Typically, the output of the deep learning model further comprises a predicted ripening time $$D = \frac{n\beta(t)}{\theta_2}$$

for the kiwifruit in the unripe stage or the slightly ripe stage, n is an average ripening time of the kiwifruit, β(t) is a ripeness value from the model 1-2 or 1-3, $\theta_2$ is a threshold dividing the ripeness value between the slightly ripe stage and the ripe stage.

According to the third aspect of the present disclosure, an electronic device is provided. The electronic device may include a non-transitory memory and a processor which are coupled with each other, wherein the memory stores program instructions, and the processor is capable of executing the program instructions to implement the above method for non-destructive ripeness identification of kiwifruit.

According to the fourth aspect of the present disclosure, a non transitory computer-readable storage medium is provided. The non-transitory computer-readable storage medium may have program instructions stored therein. The program instructions are capable of being executed by a processor to implement the above method for non-destructive ripeness identification of kiwifruit.

Compared with the related art, the present disclosure provides a method for non-destructive ripeness identification of kiwifruit based on machine vision learning, with the following beneficial effects:

1. Based on collecting a large amount of image data of kiwifruits at different ripeness stages, the present disclosure uses a deep learning method to obtain thresholds, which can guarantee a higher recognition accuracy than manual empirical recognition.

2. In the present disclosure, since whether the kiwifruit itself is damaged or not can have an impact on the color, the texture and the state of the fuzz of the skin, the construction of three models can eliminate the impact of this aspect on the accuracy of the system.

3. In the present disclosure, the original image data of kiwifruits is used to establish discriminant indexes of the color and texture of kiwifruit skin at different ripeness stages, and the deep learning algorithm is used to learn the thresholds for different ripeness stages, so as to achieve the purpose of ripe time prediction according to the ripeness of kiwifruit.

4. The present disclosure excludes human subjectivity interference, reduces human cost, is suitable for large batch recognition operation, and has higher recognition accuracy rate than manual empirical recognition. avoids damage to kiwifruit in the recognition process, and has low recognition cost.

BRIEF DESCRIPTION OF THE DRAWINGS

In order to illustrate technical solutions of the embodiments of the present disclosure clearly, accompanying drawings for describing the embodiments will be introduced in brief Obviously, the drawings in the following description are only some embodiments of the present disclosure. For the person of ordinary skill in the art, other drawings may be obtained based on the provided drawings without any creative work, wherein.

DETAILED DESCRIPTION

The present disclosure will be described clearly and thoroughly herein by accompanying appended figures of some embodiments. Apparently, the embodiments are only part of the present disclosure and are not the whole disclosure. For the person of ordinary skill in the art, other embodiments may be obtained based on the provided embodiments without any creative work, and the other embodiments are also covered by the present disclosure.

Figure 1:
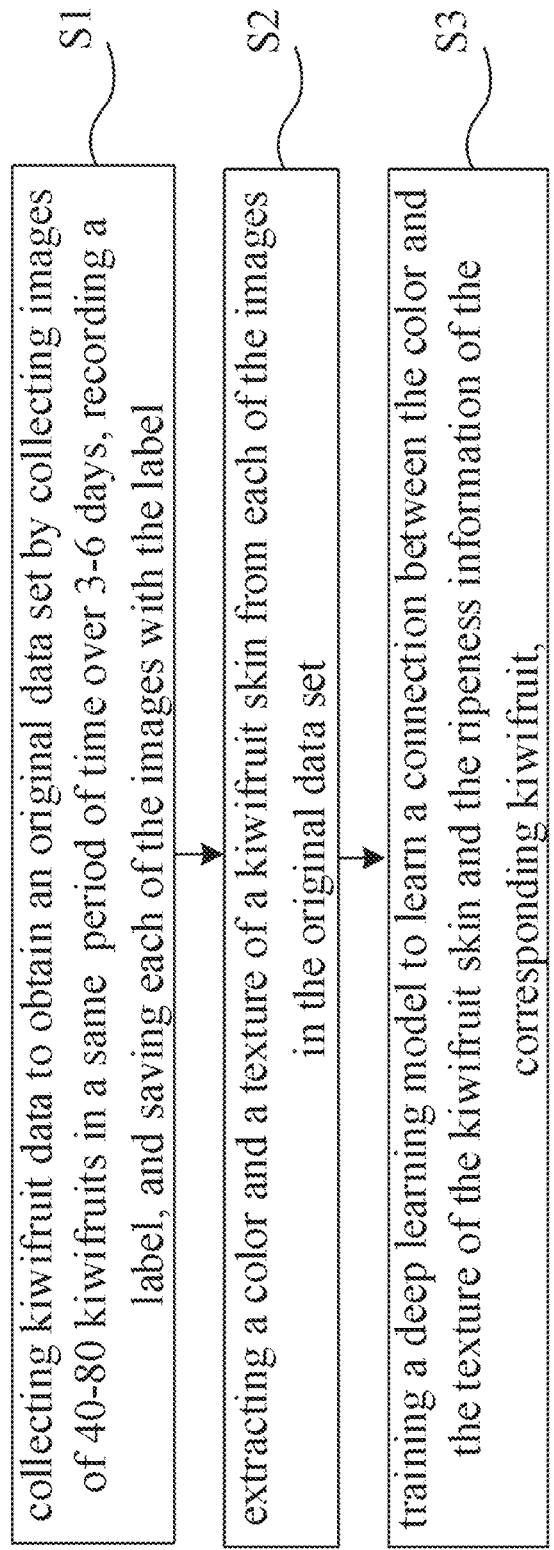
FIG. 1 is a flow diagram of a method for non-destructive ripeness identification of kiwifruit based on machine vision learning according to an embodiment of the present disclosure.

Referring to FIG. 1, FIG. 1 is a flow diagram of a method for non-destructive ripeness identification of kiwifruit based on machine vision learning according to an embodiment of the present disclosure. Specifically, the method may include the following blocks.

In block S1: kiwifruit data can be collected to obtain an original data set.

Images of 40-80 kiwifruits can be collected in the same period of time over 3-6 days. For each of the images, a label, which comprises ripeness information obtained by pressing at a the same location of a corresponding kiwifruit to determine whether the corresponding kiwifruit is ripe using an empirical judgment method, can be recorded. Each of the images can be saved with the label.

Typically, the label may further comprise damage information indicating whether the corresponding kiwifruit is damaged.

Typically, the quantity of the kiwifruits may be 60 and the number of the days may be 4. Alternatively, the quantity of the kiwifruits may be 80 and the number of the days may be 6.

Typically, the images are collected above at least one box having a color contrasting with a color of the kiwifruit and containing at least one of the 40-80 kiwifruits, so as to prevent boxes of similar color to the kiwifruit from affecting the contrast of kiwifruit image and improve the image clarity.

In block S2: the color and the texture of a kiwifruit skin can be extracted from each of the images in the original data set.

In block S3: a deep learning model can be trained to learn the connection between the color and the texture of the kiwifruit skin and the ripeness information of the corresponding kiwifruit.

The ripeness information is divided into three stages—unripe, slightly ripe and ripe. The deep learning model can be trained using the color and the texture of the kiwifruit skin extracted from each of the images and the label.

Figure 2:
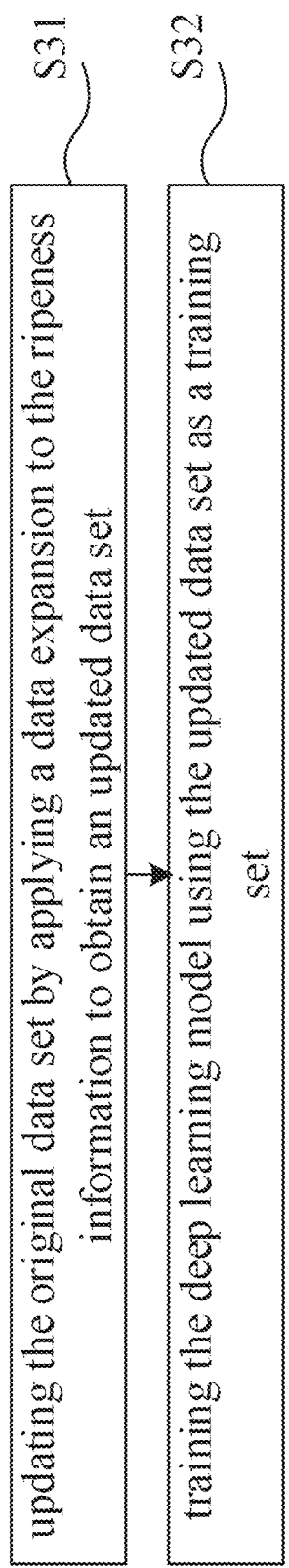
FIG. 2 is a flow diagram of S3 of FIG. 1.

Referring to FIG. 2, S3 may include the following blocks.

In block S31: the original data set can be updated by applying a data expansion to the ripeness information to obtain an updated data set.

Figure 3:
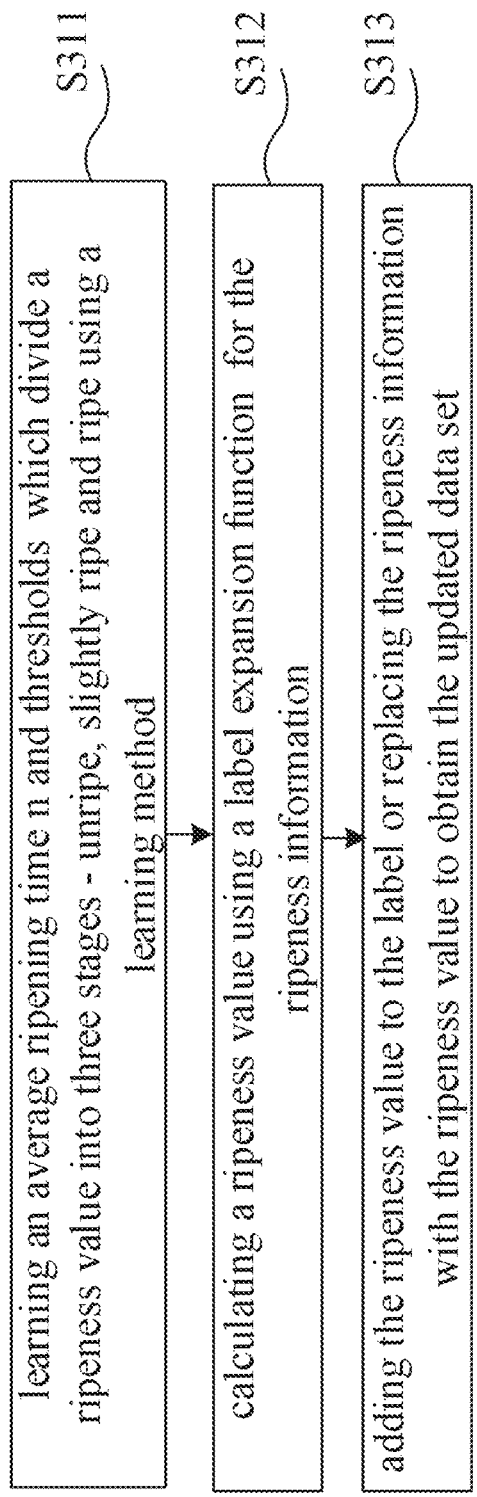
FIG. 3 is a flow diagram of S31 of FIG. 2.

Referring to FIG. 3, S31 may include the following blocks.

In block S311: an average ripening time n and thresholds $\theta(\theta_1,\theta_2)$ which divide a ripeness value into three stages—unripe, slightly ripe and ripe can be learned using a learning method.

The average ripening time n is an average duration $\Delta t$: $\overline{t_2-t_1}$ for the ripeness information to change from unripe to ripe, wherein $t_1$ is a day number corresponding to the unripe stage, $t_2$ is a day number corresponding to the ripe stage. The $t_1$ and $t_2$ may be specific for each kiwifruit. In some embodiments, the kiwifruit is in the unripe stage on day $t_1$, in the slightly ripe stage in day(s) $t_1+1\sim t_2-1$, and in the ripe stage on day $t_2$.

The $\theta_1$ is a threshold dividing the ripeness Value between the unripe stage and the slightly ripe stage. The $\theta_2$ is a threshold dividing the ripeness value between the slightly ripe stage and the ripe stage.

At block S312: a ripeness value can be calculated using a label expansion function $$\beta = \frac{\beta_{t_2} - \beta_{t_1}}{\Delta t} \cdot t$$

for the ripeness information.

The t is a day number corresponding to the label, $\beta_{t_1}$ is a ripeness value for the unripe stage corresponding to the day number $t_1$, $\beta_{t_2}$ is a ripeness value for the ripe stage corresponding to the day number $t_2$.

In block S313: the ripeness value can be added to the label or replacing the ripeness information to obtain the updated data set.

In block S32: the deep learning model can be trained using the updated data set as a training set.

Typically, the deep learning model comprises: model 1-1 configured to determine whether a kiwifruit is damaged, model 1-2 configured, to determine the ripeness information of the kiwifruit under the circumstance that the kiwifruit is damaged, and model 1-3 configured to determine the ripeness information of the kiwifruit under the circumstance that the kiwifruit is undamaged.

Typically, the kiwifruit which is damaged is coded as 1, the kiwifruit which is, undamaged is coded, as 0, the unripe stage is coded as 0, the slightly ripe stage is coded as 1, and the ripe stage is coded as 2. Tensorflow unit in python is used for deep learning.

Typically, the output of the model 1-1 is $$\begin{cases} \text{Destructive} = \alpha_1 \\ \text{Nondestructive} = \alpha_2 \end{cases}, 0 < \alpha_1, \alpha_2 < 1,$$

the expression of the model 1-1 is $$YN = \begin{cases} 1, & \text{if } \alpha_1 > \alpha_2 \\ 0, & \text{others} \end{cases}.$$

Then the model 1-2 or 1-3 can be selected for further processing based on the expression of the model 1-1.

Typically, an output of the model 1-2 or 1-3 is a ripeness value $\beta$, an expression of the model 1-2 or 1-3 is $$\beta' = \begin{cases} 0, & \beta < \theta_1 \\ 1, & \theta_1 < \beta < \theta_2 \\ 2, & \theta_2 < \beta \end{cases}.$$

The output of the deep learning model may comprise the expression of the model 1-2 or 1-3 as the estimated ripeness information.

Compared with the related art, the present disclosure provides a method for non-destructive ripeness identification of kiwifruit based on machine vision learning, with the following beneficial effects:

1. Based on collecting a large amount of image data of kiwifruits at different ripeness stages, the present disclosure uses a deep learning method to obtain thresholds, which can guarantee a higher recognition accuracy than manual empirical recognition.

2. In the present disclosure, since whether the kiwifruit itself is damaged or not can have an impact on the color, the texture and the state of the fuzz of the skin, the construction of three models can eliminate the impact of this aspect on the accuracy of the system.

3. In the present disclosure, the original image data of kiwifruits is used to establish discriminant indexes of the color and texture of kiwifruit skin at different ripeness stages, and the deep learning algorithm is used to learn the thresholds for different ripeness stages, so as to achieve the purpose of ripe time prediction according to the ripeness of kiwifruit.

4. The present disclosure excludes human subjectivity interference, reduces human cost, is suitable for large batch recognition operation, and has a higher recognition accuracy rate than manual empirical recognition, avoids damage to kiwifruit in the recognition process, and has low recognition cost.

Figure 4:
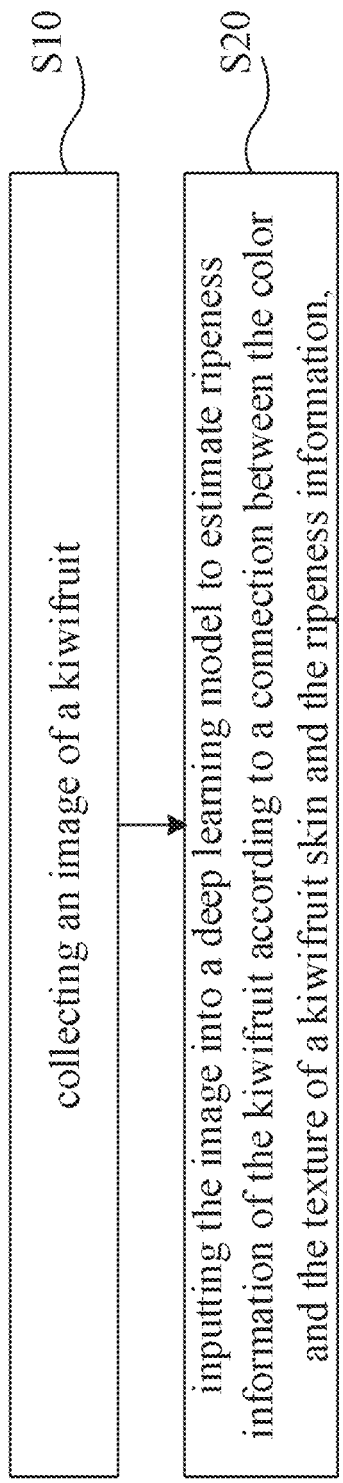
FIG. 4 is a flow diagram of a method for non-destructive ripeness identification of kiwifruit based on machine vision learning according to another embodiment of the present disclosure.

Referring to FIG. 4, FIG. 4 is a flow diagram of a method for non-destructive ripeness identification of kiwifruit based on machine vision learning according to another embodiment of the present disclosure. Specifically, the method may include the following blocks.

In block S10: an image of a kiwifruit can be collected.

In block S20: the image can be inputted into a deep learning, model to estimate ripeness information of the kiwifruit according to a connection between the color and the texture of a kiwifruit skin and the ripeness information.

The ripeness information is divided into three stages—unripe, slightly ripe and ripe. The deep learning model can be trained using the method in the above embodiment.

Typically, the deep learning model comprises: model 1-1 configured to determine whether a kiwifruit is damaged, model 1-2 configured to determine the ripeness information of the kiwifruit under the circumstance that the kiwifruit is damaged, and model 1-3 configured to determine the ripeness information of the kiwifruit under the circumstance that the kiwifruit is undamaged.

Typically, an output of the deep learning model further comprises a consumption suggestion for the kiwifruit, the consumption suggestion comprises no consumption for the kiwifruit in the unripe stage, consumption in next several days for the kiwifruit in the slightly ripe stage, and consumption in a same day for the kiwifruit in the ripe stage.

Typically, the output of the deep learning model further comprises a predicted ripening time $$D = \frac{n\beta(t)}{\theta_2}$$

for the kiwifruit in the unripe stage or the slightly ripe stage, n is an average ripening time of the kiwifruit, β(t) is a ripeness value from the model 1-2 or 1-3 $\theta_2$ is a threshold dividing the ripeness value between the slightly ripe stage and the ripe stage.

Figure 5:
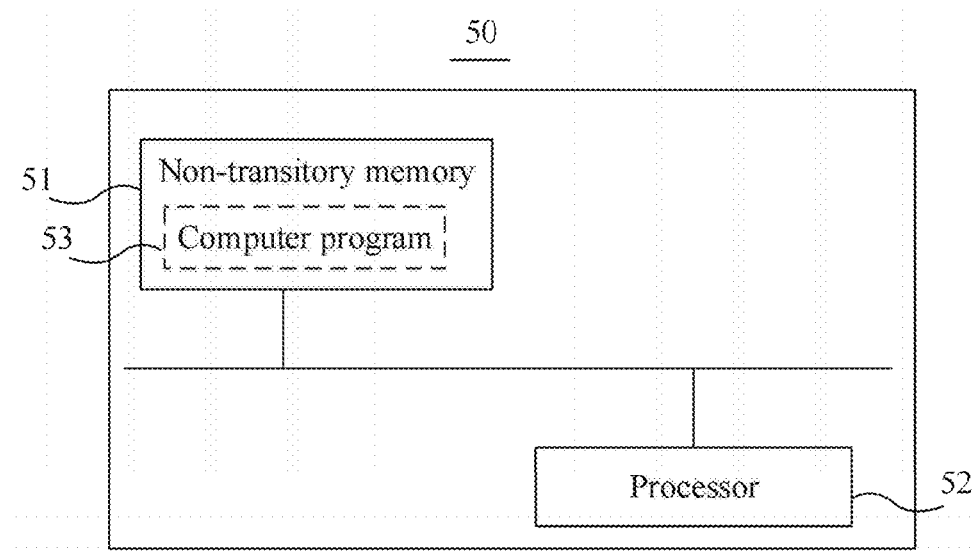
FIG. 5 is a schematic diagram of a framework of the electronic device according to an embodiment, of the present disclosure.

Referring to FIG. 5, FIG. 5 is a schematic diagram of a framework of the electronic device 50 according to an embodiment of the present disclosure. As shown in FIG. 5, the electronic device 50 may include a memory 51, a processor 52 and a computer program 53 stored on the memory 51 and runnable on the processor, and the processor 52 may be configured to implement the method for non-destructive ripeness identification of kiwifruit based on machine vision learning in any of the above embodiments of the present disclosure when executing the computer program 53. Specifically, the electronic device 50 may include, but is not limited to: a cell-phone, a pad computer a notebook, etc., which will not be limited by the present disclosure.

Figure 6:
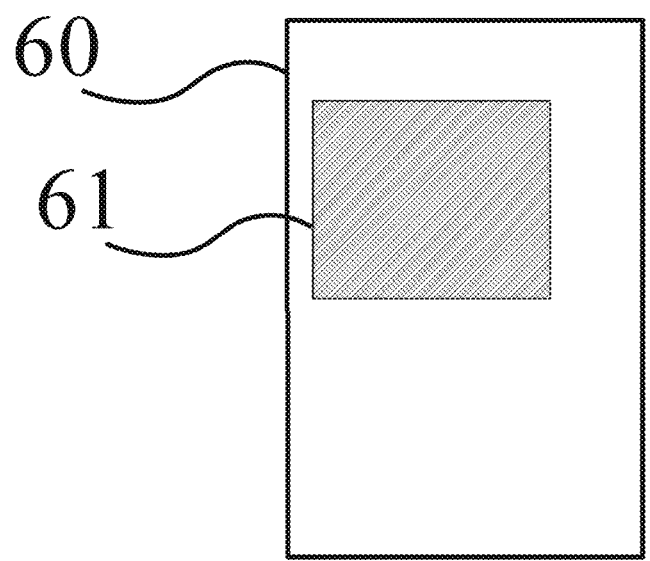
FIG. 6 is a schematic diagram of a framework of the non-transitory computer-readable storage medium according to an embodiment of the present disclosure.

Referring to FIG. 6, FIG. 6 is a schematic diagram of a framework of the computer-readable storage medium 60 according to an embodiment of the present disclosure. As shown in FIG. 6, the computer-readable storage medium 60 may include a stored computer program 61, and the computer program 61 when executed by the processor, may be configured to implement the method for non-destructive ripeness identification of kiwifruit based on machine vision learning in any of the above embodiments.

The above description of the various embodiments tends to emphasize the differences between the various embodiments, which are identical or similar enough to be cross-referenced and will not be repeatedly described hereinafter for brevity.

In some embodiments of the present disclosure, understandably, the disclosed methods and devices may be implemented in other ways. For example, the embodiments of the devices described above may merely be schematic, for example, the division of modules or units may serve as a logical functional division only, may be divided in another way when actually implemented, for example, a plurality of units or components may be combined or may be integrated into another system, or some features may be ignored, or not implemented. Moreover, the mutual coupling or direct coupling or communication connections shown or discussed may be indirect coupling or communication connections through some interface, or device or unit, may be electrical, mechanical, or other forms.

The units illustrated as individual components may or may not be physically separated, and the components displayed as units may or may not be physical units, i.e., the components may be located in one place, or the components may be distributed to a plurality of network units. Some or all of these units may be selected according to practical needs to achieve the purpose of the embodiments.

Alternatively, each functional unit in the various embodiments of the present application may be integrated into a single processing unit, or each unit may be physically present separately, or two or more units may be integrated into a single unit. The above integrated units may be implemented either in the form of hardware or in the form of software functional units.

The integrated unit, when implemented as a software functional unit and sold or used as an individual product, may be stored in a non-transitory computer-readable storage medium. Understandably, the technical solution of the present disclosure, all or part of the technical solution that essentially contributes to the prior art, may be embodied in the form of a software product that is stored in a storage medium and includes a number of instructions to allow a computer device (may be a personal computer, server, or network device, etc.) or processor to perform all or some of the operations of the various embodiments of the present disclosure. The aforementioned storage medium includes: USB flash drive, removable hard disk, Read-Only Memory (ROM), Random Access Memory (RAM), disk or CD-ROM, and other media that may store program code.

What is claimed is:

1. A method for non-destructive ripeness identification of kiwifruit based on machine vision learning, comprising:
    S1: collecting kiwifruit data to obtain an original data set by collecting images of 40-80 kiwifruits in a same period of time over 3-6 days, recording a label, which comprises ripeness information obtained by pressing at a the same location of a corresponding kiwifruit to determine whether the corresponding kiwifruit is ripe using an empirical judgment method, for each of the images, and saving each of the images with the label;

S2: extracting a the color and a the texture of a kiwifruit skin from each of the images in the original data set; and S3: training a deep learning model to learn a connection between the color and the texture of the kiwifruit skin and the ripeness information of the corresponding kiwifruit, wherein the ripeness information is divided into three stages-unripe, slightly ripe and ripe, using the color and the texture of the kiwifruit skin extracted from each of the images and the label.

2. The method of claim 1, wherein the label further comprises damage information indicating whether the corresponding kiwifruit is damaged.

3. The method of claim 2, wherein the training the deep learning model comprises:

S31: updating the original data set by applying a data expansion to the ripeness information to obtain an updated data set; and S32: training the deep learning model using the updated data set as a training set.

4. The method of claim 3, wherein the updating the original data set by applying the data expansion to the ripeness information to obtain the updated data set comprises:

S311: learning an average ripening time n and thresholds $\theta(\theta_1,\theta_2)$ which divide a ripeness value into three stages-unripe, slightly ripe and ripe using a learning method, wherein the average ripening time n is an average duration $\Delta t$: $\overline{t_2-t_1}$ for the ripeness information to change from unripe to ripe, $t_1$ is a day number corresponding to the unripe stage, $t_2$ is a day number corresponding to the ripe stage;

S312: calculating a ripeness value using a label expansion function $$\beta = \frac{\beta_{t_2} - \beta_{t_1}}{\Delta t} \cdot t$$

for the ripeness information, wherein the t is a day number corresponding to the label, $\beta_{t_1}$ is a ripeness value for the unripe stage corresponding to the day number $t_1$, $\beta_{t_2}$ is a ripeness value for the ripe stage corresponding to the day number $t_2$; and S313: adding the ripeness value to the label or replacing the ripeness information with the ripeness value to obtain the updated data set.

5. The method of claim 3, wherein the deep learning model comprises:

model 1-1 configured to determine whether a kiwifruit is damaged, model 1-2 configured to determine the ripeness information of the kiwifruit under the circumstance that the kiwifruit is damaged, and model 1-3 configured to determine the ripeness information of the kiwifruit under the circumstance that the kiwifruit is undamaged.

6. The method of claim 5, wherein the kiwifruit which is damaged is coded as 1, the kiwifruit which is undamaged is coded as 0, the unripe stage is coded as 0, the slightly ripe stage is coded as 1, the ripe stage is coded as 2, a Tensorflow unit in python is used for deep learning;

an output of the model 1-1 is $$\begin{cases} \text{Destructive} = \alpha_1 \\ \text{Nondestructive} = \alpha_2 \end{cases}, 0 < \alpha_1, \alpha_2 < 1,$$

an expression of the model 1-1 is $$YN = \begin{cases} 1, & \text{if } \alpha_1 > \alpha_2 \\ 0, & \text{others} \end{cases};$$

an output of the model 1-2 or 1-3 is a ripeness value $\beta$, an expression of the model 1-2 or 1-3 is $$\beta' = \begin{cases} 0, & \beta < \theta_1 \\ 1, & \theta_1 < \beta < \theta_2 \\ 2, & \theta_2 < \beta \end{cases}.$$

7. The method of claim 1, wherein the collecting the kiwifruit data to obtain the original data set by collecting the images of 40-80 kiwifruits in the same time period of each of 3-6 days comprises:

collecting the kiwifruit data to obtain the original data set by collecting the images of 60 kiwifruits in the same period of time over 4 days.

8. The method of claim 1, wherein the images are collected above at least one box having a color contrasting with a color of the kiwifruit and containing at least one of the 40-80 kiwifruits.

* * * * *